United States Patent [19]

Liggett, deceased et al.

[11] 4,378,276
[45] Mar. 29, 1983

[54] ELECTROLYTIC TREATMENT OF WATER

[76] Inventors: James J. Liggett, deceased, late of Twin Falls, Id.; by Lydia M. Liggett, executrix, 1235 Holly Dr., Twin Falls, Id. 83301

[21] Appl. No.: 257,896

[22] Filed: Apr. 27, 1981

Related U.S. Application Data

[62] Division of Ser. No. 117,490, Feb. 1, 1980.

[51] Int. Cl.³ .............................................. C02C 5/12
[52] U.S. Cl. ................................... 204/149; 204/152
[58] Field of Search ................................ 204/152, 149

[56] References Cited

U.S. PATENT DOCUMENTS

| | | | |
|---|---|---|---|
| 3,801,482 | 4/1974 | King | 204/152 |
| 3,964,991 | 6/1976 | Sullins | 204/149 |
| 4,048,031 | 9/1977 | Valanti | 204/152 |
| 4,104,142 | 8/1978 | King | 204/152 |

Primary Examiner—T. Tufariello
Attorney, Agent, or Firm—Edmond T. Patnaude

[57] ABSTRACT

Solids precipitate out of an aqueous solution after it has passed through a negatively charged tubular steel electrode and then through the annular space between the negatively charged electrode and a positively charged tubular aluminum electrode.

7 Claims, 3 Drawing Figures

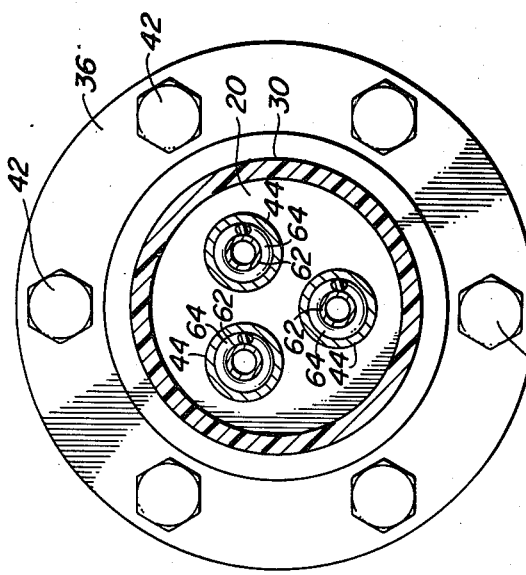
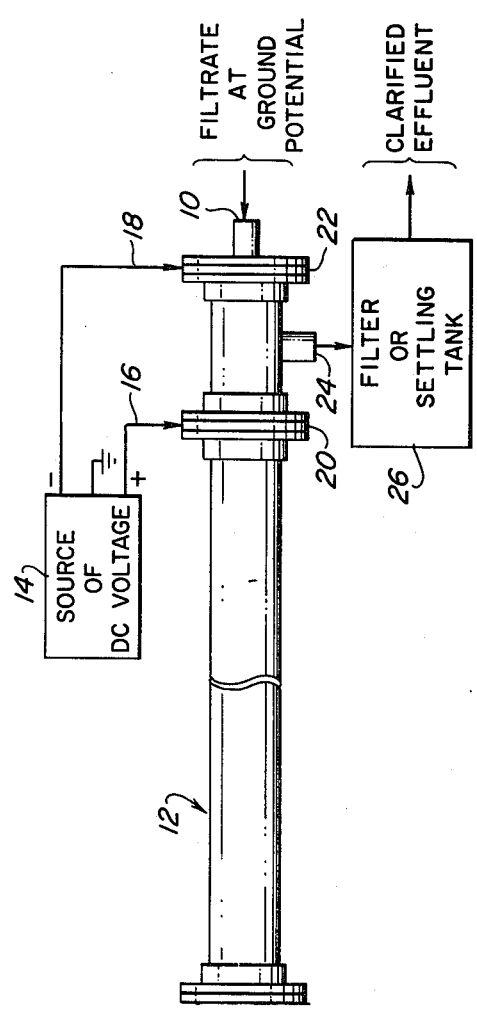
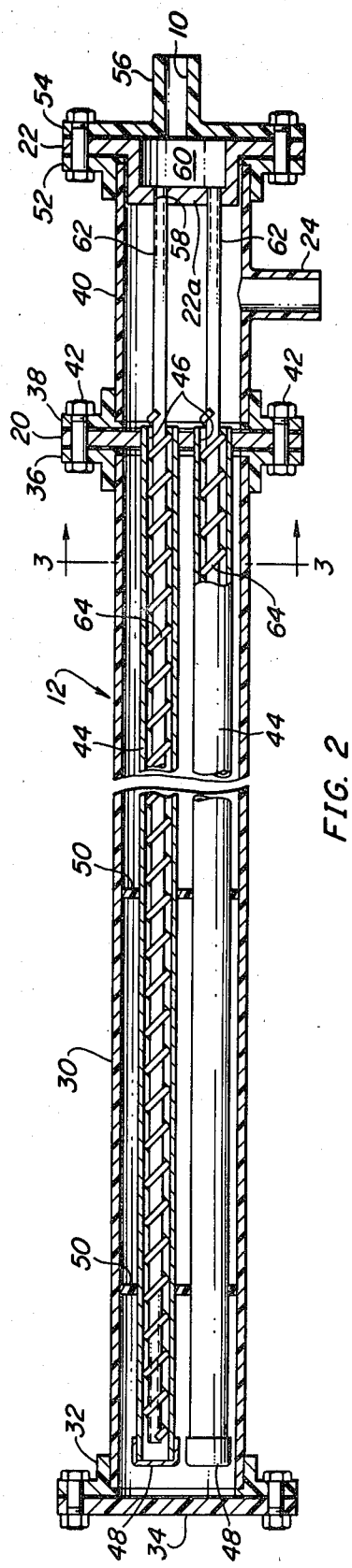

ELECTROLYTIC TREATMENT OF WATER

This is a division, of application Ser. No. 06/117,490, filed on Feb. 1, 1980.

The present invention relates in general to the electrolytic treatment of liquids, and it relates in particular to new and improved methods and apparatus for electrolytically treating aqueous solutions to cause dissolved solids to precipitate out of the solution.

BACKGROUND OF THE INVENTION

Electrochemical floculation of impure aqueous solutions has been known for many years, but no practical and economical method of treating large volumes of effluent has heretofore been found. With ever increasing standards of effluent purity being imposed on processing and sewage treatment facilities, there is a strong need for an economical method of removing dissolved and other impurities from waste water, streams and the like. Preferably, such a method should be continuous and should be carried out using equipment having a low initial cost, low energy consumption and a low maintenance cost.

SUMMARY OF THE INVENTION

Briefly, there is provided in accordance with the teachings of the present invention an elongated, tubular precipitator through which the water to be purified flows. Shortly after exiting the precipitator, dissolved solids become floculated and can thereafter be separated from the water in any one of several ways including filtration, settling and centrifuging.

The precipitator is of a novel construction and includes a plurality of electrode sets each comprising an open ended tubular steel cathode disposed in coaxial relationship within a closed ended outer tubular aluminum electrode. The electrodes are maintained in uniform spaced apart relationship by means of a helical insulator which together with the outer surface of the inner electrode and the inner surface of the outer electrode defines a helical passageway through which the water being treated must pass between the two electrodes. The inner and outer electrodes are respectively connected to the negative and positive output terminals of a low voltage, high current source of direct electric energy. The cathode electrode is maintained at a negative voltage relative to that of the liquid entering the device. The outer electrode, which is a sacrificial anode, is readily replaceable. A plurality of the electrode sets are arranged within a protective pipe formed of plastic.

The water being treated first flows from an inlet manifold at one end of the unit toward the other end through the cathode electrodes and then flows back through the helical spaces between the inner and outer electrodes before leaving the precipitator through an outlet manifold and a flow restrictive discharge tube. Accordingly, the water first travels for an appreciable period of time in contact with the cathode and only thereafter does it pass through the electric field established between the cathode and anode. This sequence appears to be of considerable importance inasmuch as the flow of water in the reverse direction through the precipitator provides appreciably less subsequent precipitation.

GENERAL DESCRIPTION OF THE DRAWINGS

The present invention will be better understood by a reading of the following detailed description taken in connection with the accompanying drawing wherein:

FIG. 1 is a schematic diagram of a water purification system embodying the present invention;

FIG. 2 is a longitudinally sectioned view of an electrolytic precipitator embodying the invention; and FIG. 3 is a cross-sectional view taken along the line 3—3 in FIG. 2.

DETAILED DESCRIPTION OF THE INVENTION

Referring particularly to FIG. 1, a filtrate such as an aqueous solution containing dissolved solids is supplied under pressure to the inlet 10 of a precipitator 12 embodying the present invention. If desired, an ozone treatment device may be mounted at the inlet end of the precipitator 12 for destroying bacteria contained in the liquid entering the precipitator 12. The unit 12 is powered from a source of D.C. voltage 14 which is connected by a pair of low resistance conductors 16 and 18 to respective electric bus plates 20 and 22. After electrolytic treatment within the precipitator 12 the aqueous solution exits through an outlet 24. Flocuation of the dissolved solids has already commenced at this time and is completed a very short time thereafter. Separation of the solids from the liquid is preferably effected by passing the solution through a filter or by retaining it for up to about five minutes in a settling tank or basin 26.

The unit 12 which is more fully described hereinafter has been successfully used to purify sewage, river water and the effluent from a potato processing plant. However, the method and apparatus can be used to purify water containing other materials in solution.

Referring to FIG. 2, the precipitator 12 may be seen to include a housing in the form of an elongated plastic pipe 30 having a plastic flange 32 bonded to one end. An end cap 34 is bolted to the flange 32 to seal the end of the tube 30 from the atmosphere. A similar plastic flange 36 is bonded to the other end of the tube 30. A circular electric bus plate 20 formed of a good conductor, such as copper, is sealably sandwiched between the flange 36 and a similar plastic flange 38 bonded to one end of a short length of plastic pipe 40 from which the outlet 24 extends. A plurality of nut and bolt assemblies 42 removably secure the flanges and bus plate together.

A plurality of tubular anodes 44 each have one end threadedly received in a respective one of a plurality of threaded holes 46 in the bus plate 20. The other ends of the anode tubes 44 are sealably closed by end caps 48 threaded over the distal ends thereof. A plurality of circular support spacers 50 hold the tubes 44 in spaced relation relative to one another and to the pipe 30.

An end flange 52 is bonded to the outer end of the pipe section 40. The cathode bus 22 is sandwiched between the flange 52 and a plastic end piece 54 having an integral tubular sleeve portion 56 providing the product inlet 10. The bus member 22 has a central cup-like section 22A provided with a plurality of threaded bores 58 respectively aligned with the bores 46 in the bus plate 20. The section 22A together with the end piece 54 defines an inlet manifold 60 which is fed by the inlet 10.

A plurality of cathode tubes 62 each have one of their ends threadedly received in a respective one of the holes 28 and extend into respective ones of the anode tubes 44 to provide a plurality of electrode sets. The cathode tubes 62 are open at both ends with the inner ends terminating in proximity to but spaced from the inner ends of the anode tubes.

In order to space the cathodes uniformly from the ends and to assure that all of the product passes for an extended period of time through the spaces between the electrodes, each cathode tube 62 is helically wrapped with an insulating member 64. The members 64 may be cylindrical in cross section and are preferably tubular so as to be compressible and provide a good seal with the electrode surfaces against which they are pressed. It may thus be seen that liquid entering the inlet 10 flows into the inlet manifold 60 and then through the cathode tubes 62 to the inner ends thereof. The liquid paths are then reversed and the liquid travels in helical or spiral paths back through the spaces between the electrodes in each set and thus coming into intimate contact with the sacrifical anode 44. The liquid then enters the effluent outlet manifold within the section 40 and leaves the unit through the side outlet 24. The outlet may be at the top to exhaust gas from the unit. Also, of course, the unit may be mounted in an upright position.

The entire unit is easily taken apart for cleaning and repair, and the anode tubes 44 are easily replaced by simply unscrewing the tubes from the bus plate 20. Should the tubes 44 not be replaced before a rupture occurs therein, the unit can continue to operate and no leakage to the exterior will occur because of the protective housing tube 30.

The voltage source 14 is preferably an A.C. powered full wave rectifier having a low voltage, high current output. For example, voltages between the cathode and anode electrodes of about 15 volts and a current of 2 amperes have been used successfully to precipitate solids from diluted sewage sludge. However, the optimum current and voltage values will depend on the liquid to be treated and on the size of the treatment unit.

I have found that the cathode voltage should be negative relative to the incoming liquid which will normally be at earth ground. In a successful operation of the unit shown in the drawings, the cathode tubes 62 were 5 volts negative relative to earth ground. Also, the pH of the liquid was about 7 which I believe is preferable. The aluminum tubes 44 where about twenty feet long. The system precipitated about 95% of the entrained solids from the solution.

Flow of the liquid in a reverse direction through the precipitator 10 showed markedly poorer results which seems to demonstrate the importance of initially flowing the liquid through the negatively charged cathode.

The present invention may be seen to provide, in its more general aspects, a novel method of precipitating solids out of solution. The manufacturing cost field assembly, facile maintenance and replaceable sacrifical anodes. Moreover, the number of electrode sets can be increased to whatever number is required for handling the volume of water to be treated.

In the above described preferred embodiment of the invention, the anode electrode is aluminum. However, other anode materials may be preferable for certain applications. For example, where the solution of water and entrained solids is a relatively thick slurry and clarification is carried out in a settling basin, I have found that migration of the precipitate to the bottom of the basin is impeded so that unnecessarily long settling times are required. In such cases, metals having higher atomic weights, such, for example, as magnesium, iron and copper would be expected to provide improved results. Tests have shown that in some case combinations of these metals provides best results. To this end a plurality of the precipitator units using different anode materials can be arranged in series or each of the anodes in a single unit can comprise a plurality of lengths of different metals.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. The method of purifying water, comprising the steps of
    mounting a first tubular electrode within a second tubular electrode in mutual concentric spaced relationship,
    maintaining said first electrode at a negative potential relative to said second electrode,
    flowing said water in an axial direction through said first tubular electrode from one end to the other,
    then flowing said water in a reverse direction through the space between said first and second tubular electrodes, and then
    separating solids entrained in said water from said water.

2. The method of purifying water according to claim 1 wherein said water is at ground potential, comprising the further step of
    maintaining said first electrode negative with respect to ground potential.

3. The method of purifying water according to claim 2, wherein
    said anode electrode has a higher electrochemical equivalent than does said cathode electrode.

4. The method of purifying water according to claim 3, wherein
    said cathode electrode is stainless steel, and
    said anode electrode is aluminum.

5. The method of purifying water according to claim 1 wherein
    said cathode and anode electrodes are connected to a low impedence source of unidirectional voltage to establish said electric field.

6. The method of purifying water, comprising the steps of
    flowing said water through a first tubular electrode and through the annular space between said first electrode and a second tubular electrode surrounding said first electrode, and
    maintaining said first electrode at a negative potential relative to said second electrode,
    whereby soluble impurities entrained in said water are caused to precipate out of solution.

7. The method of purifying water according to claim 6 wherein
    said water flows through said first tubular electrode before flowing through said annular space.

* * * * *